United States Patent [19]

Straub

[11] Patent Number: 4,504,049
[45] Date of Patent: Mar. 12, 1985

[54] MOTOR VEHICLE CAMPING DEVICE

[76] Inventor: Robert P. Straub, 2802 Lawina Rd., Baltimore, Md. 21216

[21] Appl. No.: 497,844

[22] Filed: May 25, 1983

[51] Int. Cl.³ .............................................. B60P 3/34
[52] U.S. Cl. .................................... 296/165; 296/26; 135/88
[58] Field of Search .................... 296/26, 159, 165; 135/88

[56] References Cited

U.S. PATENT DOCUMENTS

| Re. 29,264 | 6/1977 | Woodward | 296/159 |
| 2,815,762 | 12/1957 | Smith | 135/88 |
| 3,410,598 | 11/1968 | Davis | 296/26 |
| 3,863,977 | 2/1975 | Hardinge | 296/26 |
| 3,968,809 | 7/1976 | Beavers | 296/26 |
| 4,181,348 | 1/1980 | Whitley | 296/26 |
| 4,192,543 | 3/1980 | Crawford | 296/159 |
| 4,198,089 | 4/1980 | Vafiadis | 296/165 |

Primary Examiner—Robert R. Song
Attorney, Agent, or Firm—Leonard Bloom

[57] ABSTRACT

A camping device adapted to enshroud the trailing portion of a vehicle that includes a hatchback made sufficiently large to accommodate within a bed area of the vehicle an extensible platform which substantially increases the effective length of the vehicle, the camping device provided with a plurality of elastic bands integrally formed with a membrane defining the camping device and various reinforcing devices along a trailing edge of the camping device so as to allow occupants of the vehicle to recline in the vehicle and remain protected from adverse climatological conditions.

20 Claims, 11 Drawing Figures

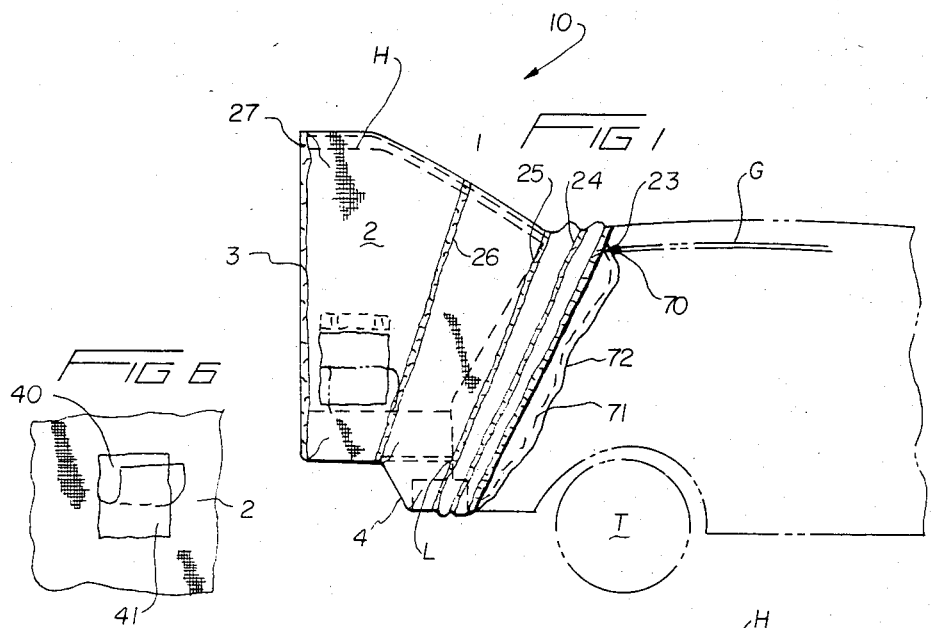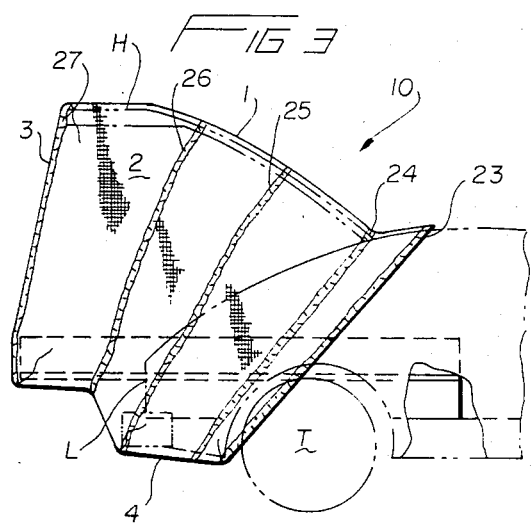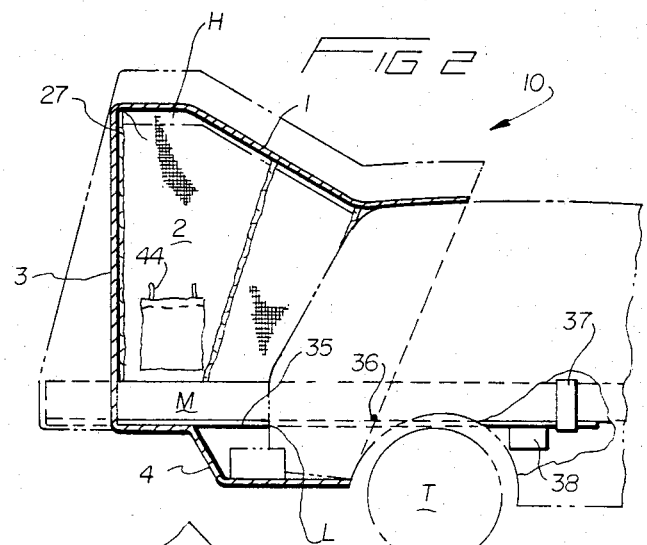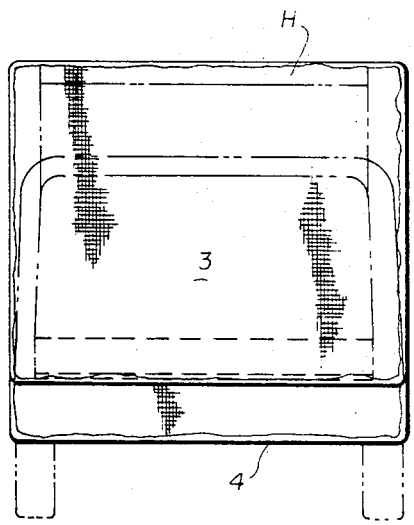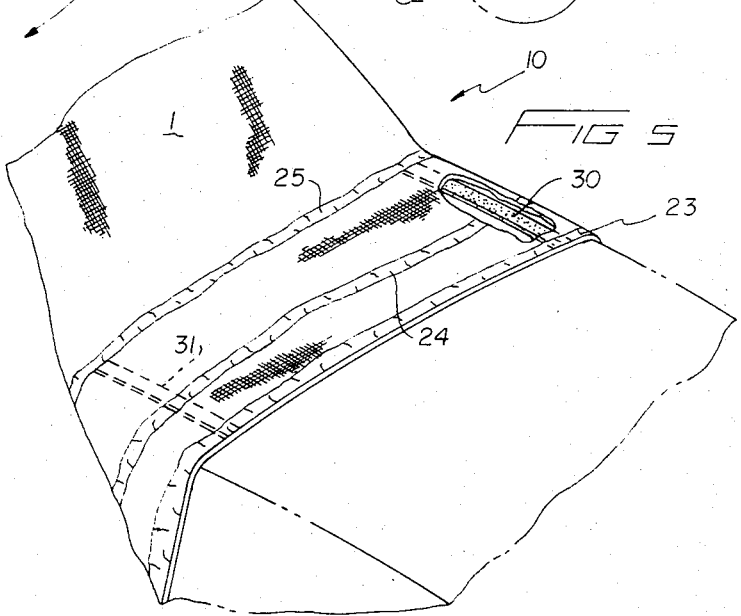

MOTOR VEHICLE CAMPING DEVICE

BACKGROUND OF THE INVENTION

The following invention relates generally to camping devices adapted to enshroud a trailing portion of a motor vehicle. More particularly, the device lends itself to being affixed to the rear portion of a vehicle having a rear door, commonly called a hatchback, the hatchback defining a pivotable panel adapted to rotate about a roof line along an axis transverse to the longitudinal extent of the vehicle.

Camping has become more than a recreational activity, it has become economic necessity to persons confronted with long journeys and inadequate means to afford conventional motel accommodations. The concomitant effort towards conservation of funds manifests itself in the utilization of vehicles that are downsized compared to prior art motor vehicles for the associated savings in energy and maintenance expenses. Whereas full sized station wagons may have at one time provided adequate space for two adults to rest, the inception and proliferation of small vehicles having rear hatchbacks no longer affords the room to the traveler that once was readily available.

To this end, a plurality of endeavors has been undertaken in the past in an attempt to resolve a long standing yet heretofore unsatisfied need at providing adequate space in downsized vehicles provided with hatchbacks so that campers and other travelers can avail themselves of the economies associated with sleeping in one'vehicle.

The following citations reflect the state of the art in which the applicant is aware insofar as these citations appear to be germane to the process at hand:

No. Re. 29,264 Woodward; U.S. Pat. No. 4,192,543 Crawford;

U.S. Pat. No. 4,181,348 Whitley et al.; U.S. Pat. No. 4,198,089 Vafiadis.

The patent to Woodward is of interest since he teaches the use of a tent for a rear doored vehicle in which the trailing edge of the vehicle has a downwardly tapered roof line, and the tent associated therewith allows for the space immediately below an extended hatchback roof to be occluded by means of tent like material. A plurality of hooks and straps are associated with the tent adapted to engage certain body portions of the car, and the rear panel which extends vertically upward from the rear bumper includes a window to enhance ventilation. The forwardmost portion of the tent terminates at the pivot area of the hatchback, so that the resulting prism shaped tent appears to merely provide imperforate panels on both sides and the rear area immediately adjacent the hatch and does not extend beyond the rear portion of the car. Moreover, there appears to be no rain or snow sealing means where the leading edge of the tent addresses the forward hinge. Thus, it should be clear that the Woodward device is constrained to merely provide panels along sides and the rear of the open hatchback, and can do nothing to extend the effective length of the vehicle, the singlemost important criteria in allowing an adult to sleep in a constricted environment. Moreover, seals are conspicuously absent along the hinged area allowing the ingress of inclement weather should such arise, and the means of attachment of the tent to the vehicle may ultimately mar the finished surface of the vehicle.

The patent to Crawford is of interest since he teaches the use of a van camper in which door panels associated with the van are adapted to rotate downwardly into a horizontal plane and associated therewith a bellows type shroud to cause the pivoting door to be shielded from inclement weather. It should be apparent however that the Crawford patent does not have a wide range of applicability and in fact appears to be a custom product adapted only to van type campers having doors which uniquely pivot and is therefore permanently attached, not lending itself to a wide deployment among vehicle owners of the class to which the instant invention is directed.

Likewise, the patent to Whitley et al. teaches the use of a trunk mountable camper capsule for automobiles or the like in which the trailing portion of a conventional vehicle having a trunk adapted to pivot just below the rear window serves as a support area upon which a massive capsule is cantilevered and extends outwardly from the rear portion of the car. Clearly this device does not lend itself to ready transport and is not as readily stowable as will be defined by the instant application. Moreover, the Whitley et al. invention appears to be dimensioned so that the weight distribution between the front and the rear wheels of the vehicle itself has been disturbed which may provide problems in handling the vehicle, headlight alignment, and substantially increased gas consumption. The installation procedures for Whitley et al. does not readily lend itself to expeditious association and dissociation with the vehicle with which it is intended to be used.

The patent to Vafiadis teaches the use of a camping unit adapted to be attached to the roof of the car which when suitably deployed does not lend itself to rapid disengagement from the associated area should it be desired to embark from the camp site in haste, as when being unexpectedly disturbed or threatened by pranksters or intruders intending to break into the vehicle. More particularly, the mounting of the device on the car roof tends to raise the center of gravity on the vehicle sometimes causing undesirable handling characteristics, and in general suggests that the instant invention could not be arrived at by viewing this citation.

By way of contrast, the instant application is directed to and specifies an improved device which is extremely lightweight, the device adapted to assist in allowing an extremely small vehicle having a hatchback to serve as a camping device for the motorist, is readily deployable, provides no marring deformation to the car when deployed and removed, and simultaneously allows for the vehicle to be driven with the device attached without adverse effect to the vehicle, its ability to operate, and the like. Moreover, an improved sealing system is associated therewith which precludes the possibility of leakage during inclement weather, an important consideration when one cares to protect the interior portion of the vehicle and to assure an uninterrupted night's sleep. Moreover, the device as to be characterized hereinafter is distinguished over the art of record since it is capable of accommodating an extension instrumentality which allows an effective length of the bed portion behind the driver's seat to be extended to substantially any length by a cantilevered support system so that even the smallest of cars can accommodate fully grown adults. The inventor advises that one of the smallest cars currently available is a Honda Civic hatchback and with the invention according to the instant application, people in excess of 6 feet tall can be allowed to enjoy a restful night's repose. The shortness of the Honda Civic Hatchback may require tie down of the forward end of the sleeping platform. The Honda Civic Hatchback station wagon however does not require tie downs. This latter car is 10" longer than the Civic Coupe, but is still quite probably the smallest wagon marketed in the U.S.

Thus, the instant invention addresses the long felt yet heretofore unsatisfied need by providing an instrumentality adapted to enshroud the trailing portion of a vehicle which has a hatchback, the instrumentality is readily deployable over the open trailing portion of the vehicle when the hatchback is opened, and an instrumentality is provided for extending the effective length of the bed area that is intrinsic to the vehicle by providing a cantilevered support system to allow people of substantially any length to be accommodated thereby. The instrumentality is defined by a membrane which overlies the trailing portion of the car including the opening adapted to enshroud same and render the trailing portion of the car impervious to the elements. An instrumentality for tensioning the membrane instrumentality in a plurality of positions on the vehicle in operative association with a sealing instrumentality along a marginal leading portion of the membrane tends to exclude adverse inclement weather while concomitantly allowing the device to be rapidly deployed and removed without marring the finish of the vehicle. The device is extremely compact and portable.

SUMMARY AND OBJECTS OF THE INVENTION

Accordingly, this invention has as an objective the provision of a new and novel camping device adapted to enshroud the trailing portion of a vehicle.

It is yet a further object of the invention to provide a device as characterized above which is extremely light weight, durable in construction, and easy to deploy.

It is yet a further object of the invention to provide a device as characterized above which lends itself to mass production techniques and is therefore economical.

It is still yet a further object of the invention to provide a device as characterized above which can accommodate people of various and diverse dimensions without cramping and allowing tall people and adults the means by which the effective bed length in the vehicle can be extended for their personal accommodation.

It is yet a further object of the invention to provide an improved ventilating means operable from the inner area of the vehicle so that the flow of air will occur without having to leave the vehicle itself.

It is still yet a further object of the invention to provide a device as characterized above which does not mar the external surface of the vehicle and provides an improved sealing means to make it difficult for inclement weather to pass therethrough.

It is still a further object of the invention to provide a device as characterized above which does not have any adverse impact on the ability of the car to be driven when the device is employed nor does it adversely affect the visability (except to the rear which can be partially overcome using the car's exterior rear view mirror) when the vehicle is to be driven.

These and other objects will be made manifest when considering the following detailed specification when taken in conjunction with the appended drawing figures wherein there has been provided a camping device adapted to enshroud a trailing portion of the vehicle that includes means for extending that area of the vehicle beyond the associated rear bumper, a membrane means overlying the extension means engaging a lower portion of the vehicle and an upper portion of a vehicle forward of the hatchback, tensioning means to operatively engage the membrane means of the vehicle in association with a sealing means suitably formed on a leading edge of the device to preclude the ingress of rain, sleet, snow, and the like.

BRIEF DESCRIPTION OF THE DRAWING FIGURES

FIG. 1 is a side view of the apparatus deployed on the trailing portion of one form of vehicle.

FIG. 2 is a view similar to FIG. 1 showing in phantom the ability of the device to accommodate trailing portions having various and diverse contours of widely differing sizes along with the ability to accommodate the extensible means for allowing adults of various sizes to fully repose therewithin, also, the means for affixion of the device on a lower portion of the vehicle is demonstrated in two possible forms.

FIG. 3 is a view similar to FIGS. 1 and 2 showing its deployment on a different style vehicle.

FIG. 4 is an end view of that which is shown in FIGS. 1, 2 and 3.

FIG. 5 is a perspective view of a top portion of the device according to the present invention including sealing means.

FIG. 6 is a detailed view of the window associated with the instant invention.

BRIEF DESCRIPTION OF THE PREFERRED EMBODIMENT

Figure 7:
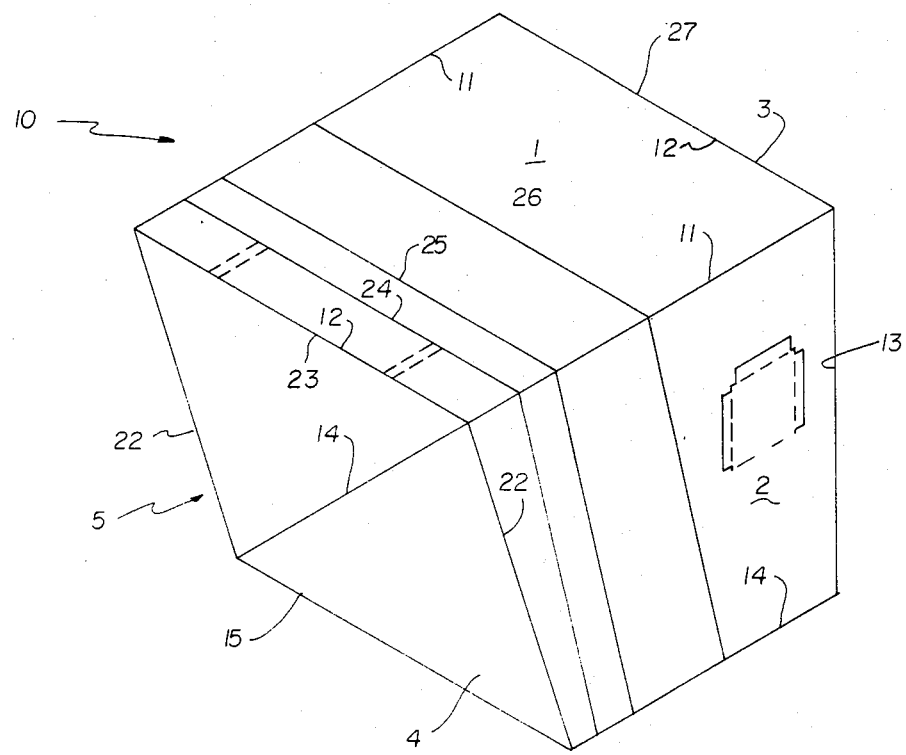
FIG. 7 is perspective view of the device shown schematically and providing the relationship of the various components.
Figure 8:
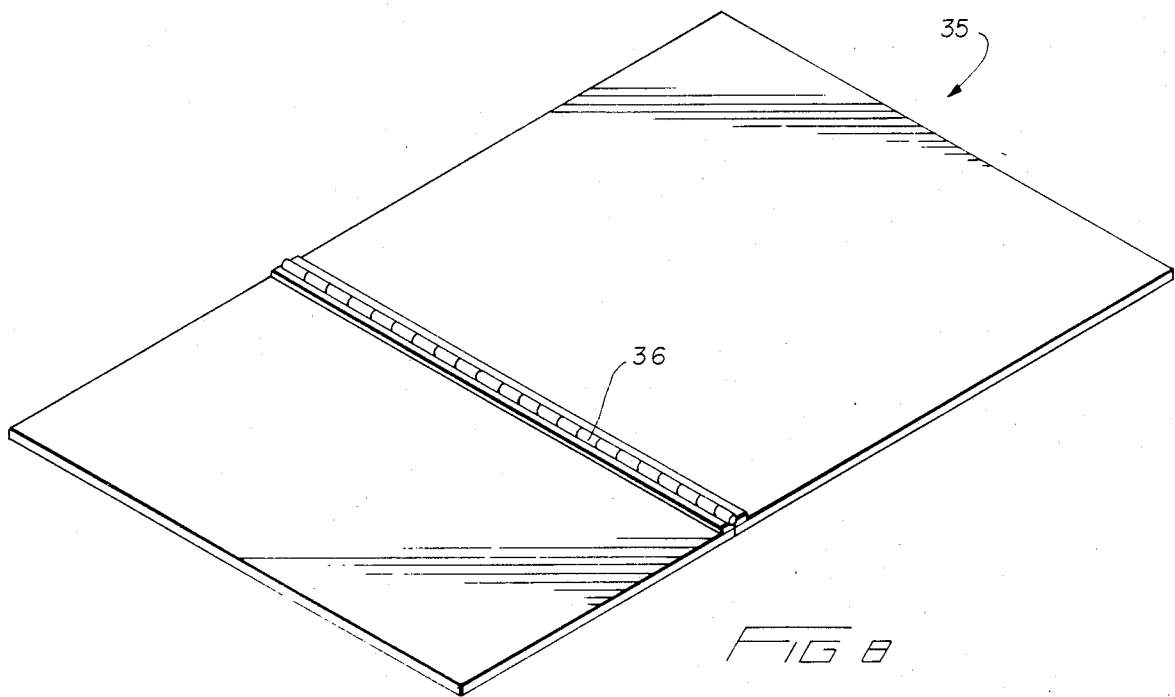
FIG. 8 is a perspective view of a device for increasing the length of the vehicle when the camping device is used.

Referring to the drawings now wherein like reference numerals refer to like parts throughout the various drawing figures, reference numeral 10 is directed to the camping device adapted to enshroud a trailing portion of a vehicle according to the present invention.

As shown in the various drawing figures, the device as defined hereinbelow, in contradistinction to the prior art is adapted to engage a plurality of vehicles having diverse rear dimensions and configurations. More specifically, attention is directed to FIG. 7 wherein there is specified a camping device having a substantially rectangular top portion 1 having a longitudinal extent approximately 15% greater than its latitudinal aspect, the top panel having longitudinal edges 11 and latitudinal edges 12. The top panel 1 communicates in turn with side panels 2 which are of trapezoidal configuration, with the angle between the trailing edge 13 adjacent a back panel 3 substantially orthogonal to the lateral edges 11. The side panels 2 have a bottom edge 14 also orthogonally related to the trailing edge 13 so that a substantially trapezoidal side panel 2 has been defined thereby with a front edge 22. Clearly therefore, the leading edge 22 at the side panel tapers from its higher portion adjacent the leading edge 12 of the top panel to its intersection with the bottom edge 14 as shown in the figure. It is contemplated that the length of the longitudinal edge 11 is ⅓ longer than the bottom edge 14.

A bottom panel 4 is provided to connect both side panels 2 along the bottom edge portion 14 thereof, and is substantially 10% larger latitudinally than the forward and trailing edges 12 at the top panel. Thus, the relationship of the leading edge 12 to the bottom edge 15 of the front portion allows when viewed from a front planar view a symmetrically formed trapezoid which defines a front opening 5 adapted to allow access from the interior portion of a vehicle to within the camping device 10.

The rear panel 3 seals the top panel 1, the two side panels 2 and the bottom panel 4 to form a bag like enclosure, the rear panel 3 defined by the top trailing edge, the side rear edges 13 and a bottom edge 15, the bottom edge and the top edge related in the same manner for the trailing portion and associated rear panel 3 as the front portion. However, it should be apparent that the front opening is obliquely oriented relative to a vertical plane, while the rear panel 3 defines a vertical plane.

The edges 11, 12, 13, 14 and 15 all define areas that are preferably seamed, so that a blank can be formed initially of five planar pieces sewed along the edges to define the bag like enclosure. The seams are preferably lapped in such a manner that they are substantially impervious to moisture as is well known in the art. The front open area 5 of the device 10 defines a peripheral edge 12,15, 22, 22 which is provided with an elastic material so as to assure snug fitting engagement of a leading edge around a forwardmost body portion of the car. The elastic material 23 (FIG. 5) is similarly to be found peripherally along the bag rearward of the leading edge and defines a second elastic band 24, a third elastic band 25 rearward of the second elastic band, and a fourth elastic band 26 so that a plurality of tensioning areas are provided to provide a generically oversized bag capable of accommodating a plurality of different dimensioned cars as suggested in FIGS. 1, 2, 3 etc. The trailing edge of the bag 12, 13 similarly is provided with an elastic member 27 for similar purposes.

The material from which the bag is to be formed can be of any type common to the camping art and a satisfactory choice of materials is one which is substantially impervious to the transmission of moisture as is well known. The bottom panel is shown in FIGS. 1, 2, and 3 being deployed in one of a plurality of modes, one in which the elastic members 23-25 engage the rear bumper of a car, as is suitable and convenient or alternatively may be brought forward on the underside of the car to engage the rear wheel well denoted just rearward of the tire T. Thus, a plurality of cars some having streamlined sweptback design or those having substantially truncated trailing portions can all be accommodated. To this end, the bottom panel 4 can be provided with a suitable temperature resistant material such as Nomex TM which is used in many environments that have to withstand the high heat that may be associated with exhaust gas temperatures commonly found along an exhaust pipe disposed proximate to the lower trailing portion of a vehicle.

Means are provided to encourage sealing engagement of the leading elastics 23, 24, 25 about the vehicle which as shown in FIG. 7 are provided around the periphery of the device 10 for its associated desired effect. For example, FIG. 7 reveals that the second elastic 24 as it extends along the bottom panel is twice as close to the leading edge 15 of the bottom panel as it is to the top associated leading edge 12. Likewise, the third elastic band is equidistant from the second elastic band around the entire periphery, as is the fourth elastic band from the third elastic band. Thus, the membrane before the second elastic band and after the fourth elastic band define wedge-shaped segments for purposes to be assigned later.

In an attempt to assist the forward elastic 23 and to retard its rearward migration should the device be utilized when the car is being driven or when strong winds are prevalent, a plurality of stays 30 are disposed along the top edge of the top panel 1 similar to battens disposed in integrally formed pockets 31 found between the first and second elastic, or as shown in FIG. 5 from the first through the third elastic. In this manner, the leading edge of the bag will resist rolling up due to air pressure.

Figure 9:
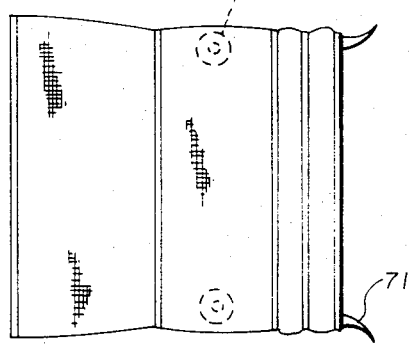
FIG. 9 is a top plan view of FIGS. 1-5 showing a form of sealing means along top and side leading edges of the device.

FIGS. 1 and 9 are directed to further enhancements to exclude the migration of driven rain as will be evident. More particularly, most roof lines along the side edges of vehicles are provided with gutters G which are adapted to channel the water from the roof top rearwardly the vehicle. Since this would tend to cause water to migrate within the device 10, a dam in the form of putty 70 or a suitable impediment to the migration of the water is included in the channelway. Thus, water tends to run over the channel away from migration into the device 10. In addition, side panels of many vehicles have compound contours which are concave adjacent the side windows and rear fender walls, which would provide a gap if elastic materials were used exclusively. To this end, a flap 71 is provided along the leading side edges of the vehicle provided with a magnetic material 72 along its leading border whereby magnetic attraction causes the leading edge 71 to assume and nest against any compound contours which may exist in a vehicle. Any water which may drain into the camping device will be therefor minimal, but it is contemplated that drainage holes are provided near the lowermost panel of the device and the drainage holes 73 are shown in phantom in FIG. 9 thereby accelerating the migration of unwanted fluid away from the camping device.

Means for extending the effective length of the vehicle bed are also provided to effect one of the most important objectives of the invention. More specifically, a sheet of substantially planar material 35 is disposed within the vehicle capable of storage as by providing same with a hinge 36 which allows folding of the planar element 35 so that rearward a lip of the car L, the portion of the panel 35 that extends therebeyond is cantilevered and supported by the major portion of the panel carried within the bed of the vehicle. The weight distribution is similarly enhanced by means of a mattress M disposed upon the panel for greater comfort. Additionally, should there be a need to do so, a tie down strap 37 is provided on a forward portion of the panel 35 so as to affix same to an integrally connected portion of the vehicle interior such as the fold down rear seats commonly found in most compact cars. Thus, by utilization of the strap and/or taking advantage purely of the weight balance by the cantilevered construction, the obtrusive effect of the upstanding lip in the vehicle bed can be negated by the use of the panel, and should it be so desired, a spacer means such as a block 38 can be disposed on a bottom forward portion of the panel to achieve a horizontal configuration of the panel should it be so desired. Without panel 35 the lip L may provide discomfort to the sleeper. Note that strap 37 can connect to existing seatbelts.

Figure 11:
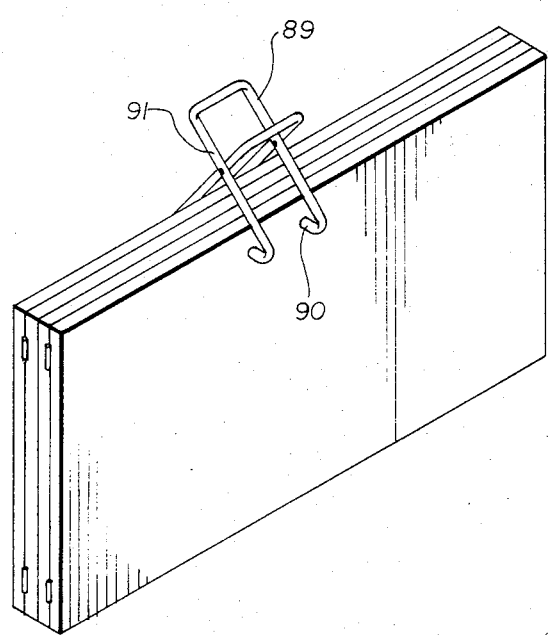
FIG. 11 shows the extension means of FIG. 10 in a folded stored position.
Figure 10:
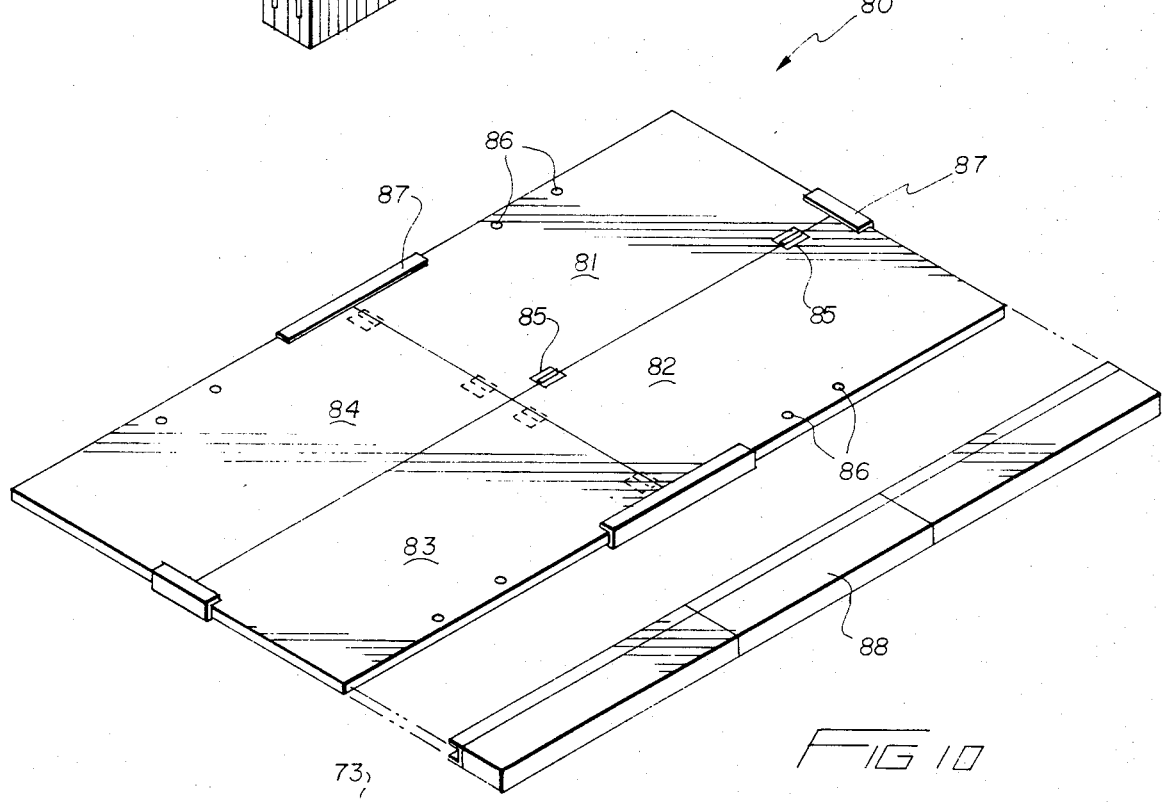
FIG. 10 is a perspective view of an arrangement alternative to that which is shown in FIG. 8.

Alternatively, panel 35 can take an additional form as shown particularly well in FIG. 10, FIG. 11 showing the device of FIG. 10 in a stored position. More particularly, the panel 80 according to a second form of the invention is formed from four segments, 81 through 84, with panels 81 and 82 hinged by means of hinges 85 along their longitudinal extent, and panels 83 and 84 hinged to panels 82 and 81 respectively by hinges disposed on an opposed surface of the thus formed panel. The device is an elongate rectangular panel when assembled in the position shown in FIG. 10 and means to constrain the hinges from rotation include in a preferred form four clips 87 adapted to overlie edges of the panel segments along fold lines defined by the panels. Reference numeral 88 of FIG. 10 is directed to a clip adapted to be disposed along one longitudinal edge of the panel 80 to increase the effective width thereof should this device be utilized in a car having a greater width than the standard size denoted by the panel 80. A plurality of holes 86 are disposed on longitudinal outermost edges of each panel so that when the device is in the folded configuration of FIG. 11 a scissors type handle formed from two U-shaped members 89 having inwardly directed tines 90 adapted to be received in the holes 86 can provide ease in portage. As shown in FIG. 11, two such U-shaped handles 89 are provided and are allowed to articulate one relative to the other by means of first and second pivot pins 91 joined substantially medially down the length of the U-shaped handle along the two legs defining legs of the U-shaped handle, the handle adapted to be gripped along a bight portion thereof. The device is adapted to be folded by rotating panels 81 and 82 down into the plane of the paper in FIG. 10 and abut against panels 84 and 83 and thereafter folded along hinges 85 shown in the drawing figures.

The side panels 2 and rear panel 3 of the device 10 may also include a window 40 fashioned from an opening 41 contained in the side panel, the window 40 being attached on an inner portion of the panel by means of tab members 44, it being noted that the window panel 40 has a greater dimension than the opening 41 so that the window panel can be operatively conditioned to either open or close from within or without the device 10.

As shown in the drawings, the device is adequately configured with sufficient slack so that various types of hatchbacks H can be accommodated also to provide the ability of having a single device to securely and reliably engage all lower trailing portions of the vehicle as by its proximate engagement with a bumper trailing the vehicle, or the associated wheelwell adjacent to the tire T.

Moreover, it should be apparent that with the elastic members peripherally disposed about the device 10, a new and novel means has been provided to securely and reliably removably affix the device as defined hereinabove without marring. Thus, in combination with the battens 30, a device has been provided which can afford the person utilizing the vehicle to rapidly deploy and remove the device or alternatively drive the vehicle with the device in place without marring the vehicle during assembly or disassembly, without altering the weight balance ratio of the vehicle, or in any other way inhibiting the primary function of the vehicle. The material chosen for the device is suitably selected such that a minimal amount of space of the vehicle will have been garnered by the apparatus associated therein.

Moreover, having thus described the invention it should be apparent that numerous structural modification are contemplated as being part of this invention as set forth hereinabove and as defined hereinbelow by the claims.

What is claimed is:

1. A camping device adapted to enshroud a trailing portion of a vehicle having a rear bed area and an openable panel on a rear face thereof, the panel pivoting about a hinge on a roof of the vehicle transverse to the longitudinal axis of the vehicle comprising in combination:
   means for extending the length of bed area of the vehicle beyond its associated rear bumper,
   membrane means overlying said extension means engaging a lower rear portion of the vehicle and an upper rear portion of the vehicle forward the hinge,
   wherein said membrane means includes a top panel, a pair of side panels depending from longitudinal edges of said top panel, a bottom panel interconnecting lowermost portions of said side panels, and a back panel sealing said top, side and bottom panels to form a bag like structure,
   tensioning means operatively associated with said membrane means to affix same to the vehicle,
   wherein said tensioning means includes a plurality of elastic membranes around the periphery of said membrane means whereby said membrane means can snugly engage vehicles of disparate proportions, and
   sealing means along marginal portions of said membrane means to exclude adverse weather therebeyond,
   including reinforcing means operatively associated with said sealing means to retard the sealing means tendency to curl up.

2. The device of claim 1 wherein said sealing means is defined by an elastic membrane disposed on a leading edge of said bag like structure adjacent an opening of said bag.

3. The device of claim 2 wherein said reinforcing means comprises a plurality of battons disposed within sleeves formed on said membrance means adjacent said leading edge of said bag like structure thereby providing resistance to said sealing means from curling up.

4. The device of claim 3 in which said membrane means is provided with at least one window means for ventilation.

5. The device of claim 4 in which said window means includes a flap attached along an edge defining said window means, said flap having an extent greater than the void defining said window means whereby a marginal portion has been provided to assure the exclusion of adverse climatology within said camping device.

6. The device of claim 5 wherein said elastic membrane is disposed along said back panel along a periphery thereof.

7. The device of claim 6 wherein three additional elastic membranes are provided intermediate said leading edge and said trailing edge all disposed in substantially parallel relationship defining parallelgrams when viewed from said side panels and obliquely oriented so that forward and rearwardmost portions of said membrance means are substantially wedge shaped when viewed from side panels from top to bottom.

8. The device of claim 7 wherein said extending means includes a panel adapted to lie within and extend beyond the bed of the vehicle.

9. The device of claim 8 wherein said extending means further includes a hinge means disposed upon said panel for facilitating folding and storage of said panel.

10. The device of claim 9 wherein means for elevating said panel are provided defined by a block disposed upon a forward leaking edge of said panel.

11. The device of claim 10 wherein said extending means includes means for supplementing the intrinsic cantilevered support associated with said panel defined by an elastic strap surrounding a forward portion of said panel and attached to the vehicle.

12. The device of claim 11 wherein said camping device includes a mattress disposed on said panel.

13. The device of claim 12 wherein said bottom panels are formed from a heat and flame resistant material.

14. The device of claim 13 wherein said panel is formed from four segments and each of the segments are interconnected by hinge means, and a plurality of clips U-shaped in section are adapted to span the areas of tangency between the adjacent panels to rigidify said panel.

15. The device of claim 14 wherein said sealing means further includes means to block up an associated vehicle gutter to prevent water migration into the camping device area.

16. The device of claim 15 wherein said sealing means further includes a magnetic strip along side edges of said camping device to attract the leading edge of the camping device against compound contours of the vehicle's side.

17. The device of claim 16 including drain holes on the bottom of said camping device to allow drainage of any water which may migrate therein.

18. A camping device adapted to enshroud a trailing portion of a vehicle having a rear bed area and an openable panel on a rear face thereof, the panel pivoting about a hinge on a roof of the vehicle transverse to the longitudinal axis of the vehicle comprising in combination:

means for extending the length of bed area of the vehicle beyond its associated rear bumper, membrane means overlying said extension means engaging a lower rear portion of the vehicle and an upper rear portion of the vehicle forward the hinge, tensioning means operatively associated with said membrane means to affix same to the vehicle, and sealing means along marginal portions of said membrane means to exclude adverse weather therebeyond, wherein said tensioning means includes a plurality of elastic membranes around the periphery of said membrane means whereby said membrane means can snugly engage vehicles of disparate proportions.

19. A camping adjunct disposed over a hatchback area of a vehicle for increasing interior volume of the vehicle passenger area comprising in combination:

a flexible bag having an open end which when deployed is slid over the rear of the vehicle and open hatchback, a plurality of elastic membranes disposed peripherally about said bag adjacent its open end to fix said bag to the vehicle, and means within the interior extending up outside the hatchback vehicle to increase the vehicle's length.

20. The camping adjunct of claim 19 wherein said means to increase the vehicle length has a free end, cantilevered from support means in the interior of the vehicle, said free end extending beyond the vehicle bumper yet within said flexible bag, and said bag is carried only by said vehicle and without a framework, end is adapted to be deployed on the vehicle when in transit.

* * * * *